United States Patent [19]
Kipfer et al.

[11] Patent Number: 6,005,654
[45] Date of Patent: Dec. 21, 1999

[54] LIQUID CRYSTAL DISPLAY DEVICE INTENDED, IN PARTICULAR, TO FORM A COLOR IMAGE DISPLAY SCREEN

[75] Inventors: Peter Kipfer; Hans Peter Herzig; Rolf Klappert; Joachim Grupp, all of Neuchâtel, Switzerland

[73] Assignee: Asulab S.A., Bienne, Switzerland

[21] Appl. No.: 09/058,304

[22] Filed: Apr. 10, 1998

[30] Foreign Application Priority Data

Apr. 17, 1997 [EP] European Pat. Off. .............. 97106355

[51] Int. Cl.[6] .......................... G02F 1/1333; G02F 1/137
[52] U.S. Cl. ......................... 349/176; 349/104; 349/106; 349/110; 349/158
[58] Field of Search ..................................... 349/106, 115, 349/176, 78, 110; 345/158, 88; 359/891, 892

[56] References Cited

U.S. PATENT DOCUMENTS

| | | | |
|---|---|---|---|
| 5,399,390 | 3/1995 | Akins | 428/1 |
| 5,493,430 | 2/1996 | Lu et al. | 359/68 |
| 5,737,045 | 4/1998 | Abileah | 349/106 |

OTHER PUBLICATIONS

G.P. Crawford: "Liquid Crystal in complex Geometries", Taylor & Francis, 1996 XP002041494 pp. 255–264, Chapter 11.2 Reflective Cholesteric Display.

Klimusheva G V et al: "External factor influence on the optical activity of chiral liquid crystals" Nonlinear Optics of Liquid and Photorefractive Crystals, Crimea, Ukraine, Oct. 23–30 1995, vol. 2795, ISSN 0227–786X, Proceedings of the SPIE—The Int. Society For Optical Eng., 1996, SPIE–Int. Soc. Opt. Eng, USA. pp. 50–55.

*Primary Examiner*—William L. Sikes
*Assistant Examiner*—Tai V. Duong
*Attorney, Agent, or Firm*—Griffin, Butler, Whisenhunt & Szipl, LLP

[57] ABSTRACT

The invention concerns a liquid crystal display device intended, in particular, to form a colour image display screen, of the type including: a first substrate which is transparent on a front side situated on the side of the viewer; and a second substrate arranged on a back side facing the first substrate and extending parallel to the latter. The first substrate is connected to the second substrate in order to delimit between them a cavity in which at least one film of liquid crystal is arranged. The liquid crystal has at least a first state in which it reflects the light of a range of wavelengths of a predetermined colour and at least a second state in which it is transparent. The surface of each substrate facing the other substrate includes electrodes to allow the liquid crystal to pass at least from the first state to the second state or conversely, by selective application of a control voltage to the electrodes. The liquid crystal display includes a filter absorbing at least the visible neighbouring wavelengths of the range of wavelengths of the predetermined colour and the closest to the wavelength 555 nm with the exception of the wavelengths of said predetermined colour. The filter is arranged on the side of the viewer with respect to the film of liquid crystal.

8 Claims, 3 Drawing Sheets

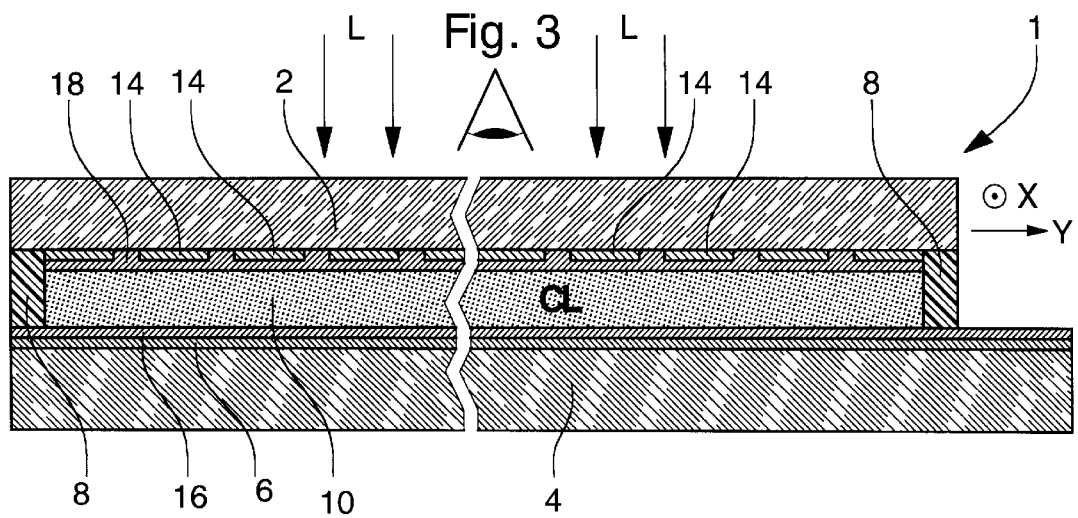
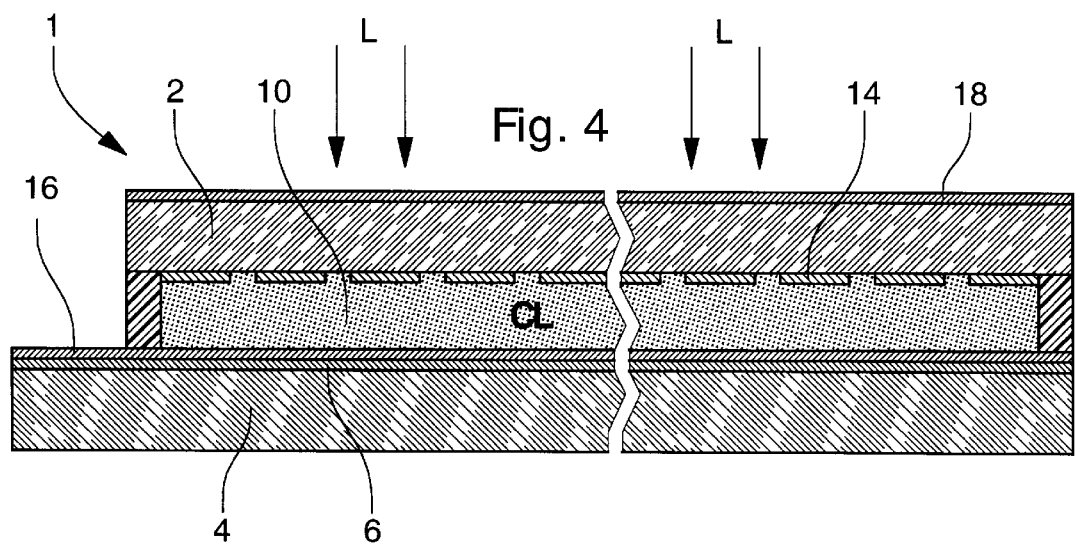
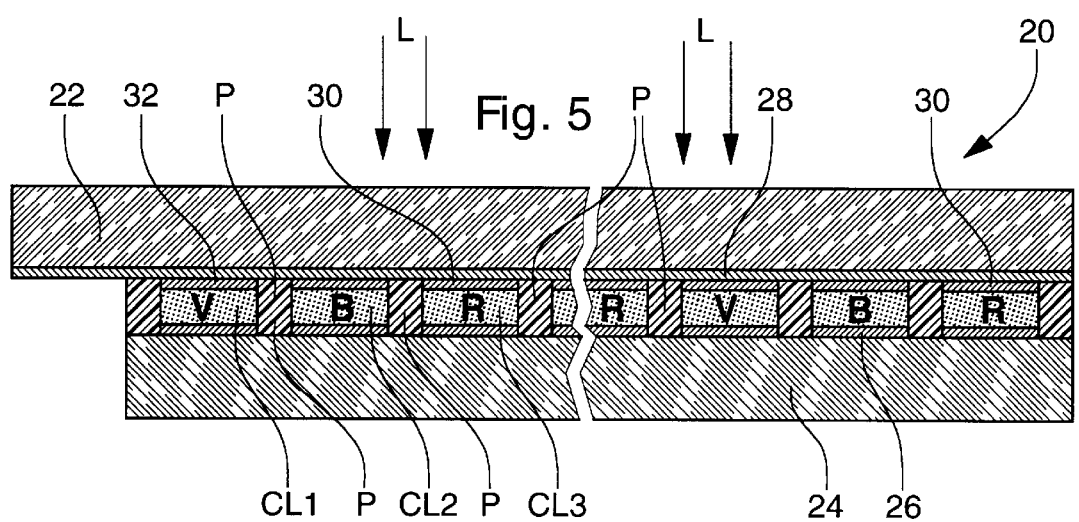

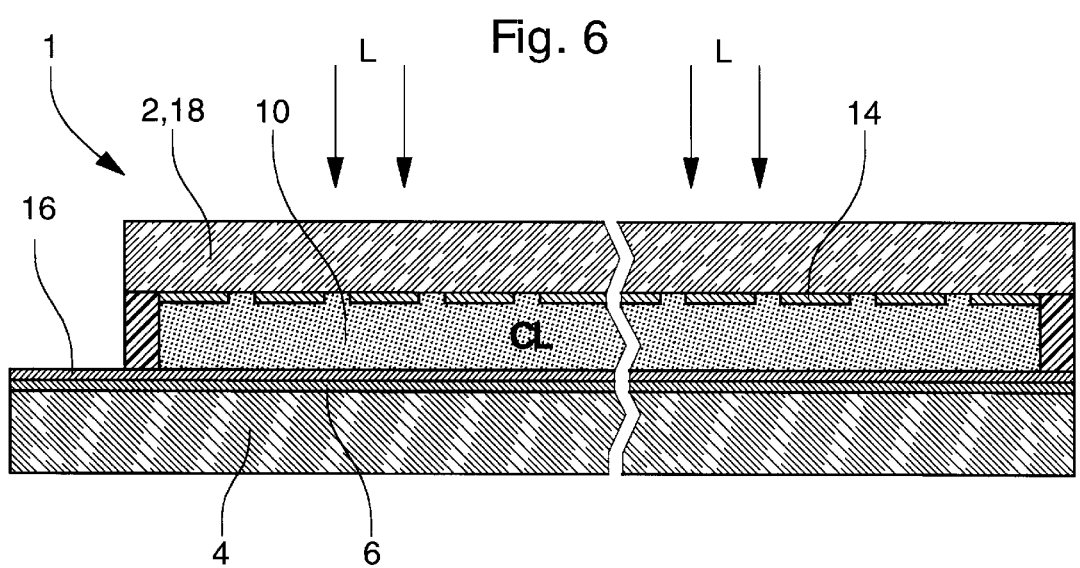

LIQUID CRYSTAL DISPLAY DEVICE INTENDED, IN PARTICULAR, TO FORM A COLOR IMAGE DISPLAY SCREEN

BACKGROUND OF THE INVENTION

The present invention concerns a liquid crystal display device intended, in particular, for the display of coloured images and more particularly such a liquid crystal display device of the cholesteric type allowing colours and in particular the colour red to be displayed with a high level of purity.

The characteristic feature of certain cholesteric liquid crystals is a periodic helical structure having a pitch which can be adjusted. This helical structure known as "planar" causes Bragg reflections whose reflection band, i.e. the range of wavelengths which it can reflect, may easily be changed by varying the pitch of the helix and/or the birefringence of the liquid crystal.

When a determined voltage is applied across the control electrodes, an electric field is created which transforms the helical structure of the crystal into an focal conic structure which is almost transmissive and reveals the surface situated behind the liquid crystal, which may for example be black if one wishes to produce a display on a black background as is described in the publication of D. K. Yong et al. entitled "Cholesteric reflective display: scheme and contrast"; Appl. Phys. Lett. 64, pages 1905 to 1994.

When several cholesteric liquid crystals having respectively an adjusted pitch to reflect a wavelength corresponding to a determined colour is introduced into a display device between two plates or substrates, a array of trichromatic pixels can be made, each pixel being made up for example of three sub-pixels of primary colours red, green and blue respectively. Control electrodes are provided on the inner surfaces of the plates, forming, for example, a matrix and allowing the liquid crystals to be excited locally to create selectively a colour picture element by additive mixture of the three primary colours. In the event that all the sub-pixels are in the planar helical state, i.e. reflecting, the resulting colour of the trichromatic pixels is white.

While the production of the primary colours green and blue poses no particular problem, it has been observed that the colour red obtained with this type of display device is always pale, which gives is a dull or faded appearance. This is explained by analysing the reflection spectrum of the red by a cholesteric type liquid crystal shown in FIG. 1. It will be noted that reflection of the wavelengths corresponding to the colour red by the liquid crystal is not perfect and that the reflection spectrum has significant fringes on either side of the main band, which detracts from the purity of the colour. These fringe effects have the additional drawback of being amplified by the human eye as can be seen in FIG. 2 which shows the reflection spectrum of FIG. 1 multiplied by the response of the human eye, which degrades the colour red and gives it a dull appearance.

In order to overcome this drawback, a solution has already been proposed in the work entitled "Liquid Crystal in Complex Geometries", by Taylor and Francis, published in 1996, page 257, such solution consisting of doping the liquid crystal with a dye which is intended to absorb the undesired portions of the reflection spectrum.

However this solution has drawbacks. The optical effect obtained is not optimum since it is possible that the light reflected by the liquid crystal has not hit dye molecules or has only been changed by a few dye molecules, so that the colour is not very saturated, or in other words, is not pure.

Moreover, this solution requires that the liquid crystal and dye mixture is physically separated from the other liquid crystals reflecting respectively the green and the blue, in order to avoid diffusion of the colorant molecules in nearby liquid crystals of different colours.

Furthermore, the poor chemical stability of the molecules forming the dye, in particular in the presence of U.V. rays, reduces the reliability and lifespan of the display device.

SUMMARY OF THE INVENTION

A main object of the invention is thus to overcome the aforementioned drawbacks of the prior art by providing a display device allowing the display of graphic symbols or images in colour having a high colour quality and allowing, in particular, the display of a red having at high degree of purity.

The invention thus concerns a liquid crystal displays device intended, in particular, to form a colour image display screen, of the type including:

a first substrate which is transparent on a front side situated on the side of the viewer;

a second substrate arranged on a back side facing the first substrate and extending parallel to the latter;

the first substrate being connected to the second substrate in order to delimit between them a cavity in which at least one film of liquid crystal is arranged;

said liquid crystal being able to have at least a first state in which it reflects the light of a range of wavelengths of a predetermined colour and at least a second state in which it is transparent, the surface of each substrate facing the other substrate including means forming electrodes to allow by selective application of a control voltage to said electrodes, the liquid crystal to pass at least from the first state to the second state, characterised in that it includes a filter absorbing at least the visible neighbouring wavelengths of the range of wavelengths of said predetermined colour and the closest to the wavelength 555 nm with the exception of the wavelengths of said predetermined colour and in that said filter is arranged on the side of the viewer with respect to said film of liquid crystal.

Thus, the filter eliminates from the spectrum light entering the cell, before it enters the film of liquid crystal, the visible wavelengths different from that corresponding to the colour that the liquid crystal has to reflect and which could deteriorate the predetermined colour. The fringe effect referred to hereinefore is thus removed from the reflected spectrum by the liquid crystal, which makes the colour reflected by the liquid crystal purer and consequently brighter.

According to an advantageous feature, the filter is arranged between the first substrate and the liquid crystal film.

Such an arrangement allows the filter to be very close to the liquid crystal and to avoid any parallax problems.

BRIEF DESCRIPTION OF THE DRAWINGS

Other features and advantages of the invention will appear more clearly upon reading the following description of an embodiment of the invention given purely by way of illustrative and non limiting example, this description being made in conjunction with the drawings in which:

FIG. 3 is a partial cross-section of a display device according to a first embodiment of the invention;

FIG. 4 is a partial cross-section of a display device according to an alternative of the embodiment of the invention shown in FIG. 3; and FIG. 5 is a partial cross-section of a display device according to a second embodiment of the invention.

FIG. 6 is a partial cross-section of a display device according to a third embodiment of the invention.

DESCRIPTION OF THE PREFERRED EMBODIMENT

Figure 1:
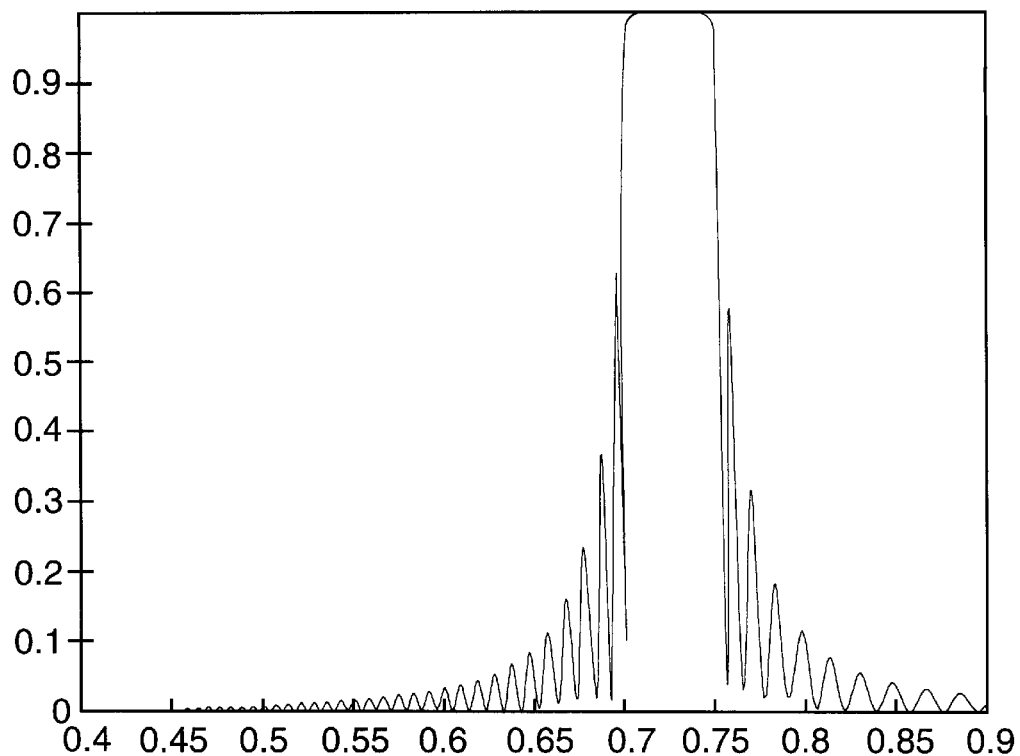
FIG. 1 is an example of a reflection spectrum of the red of a cholesteric liquid crystal.
Figure 2:
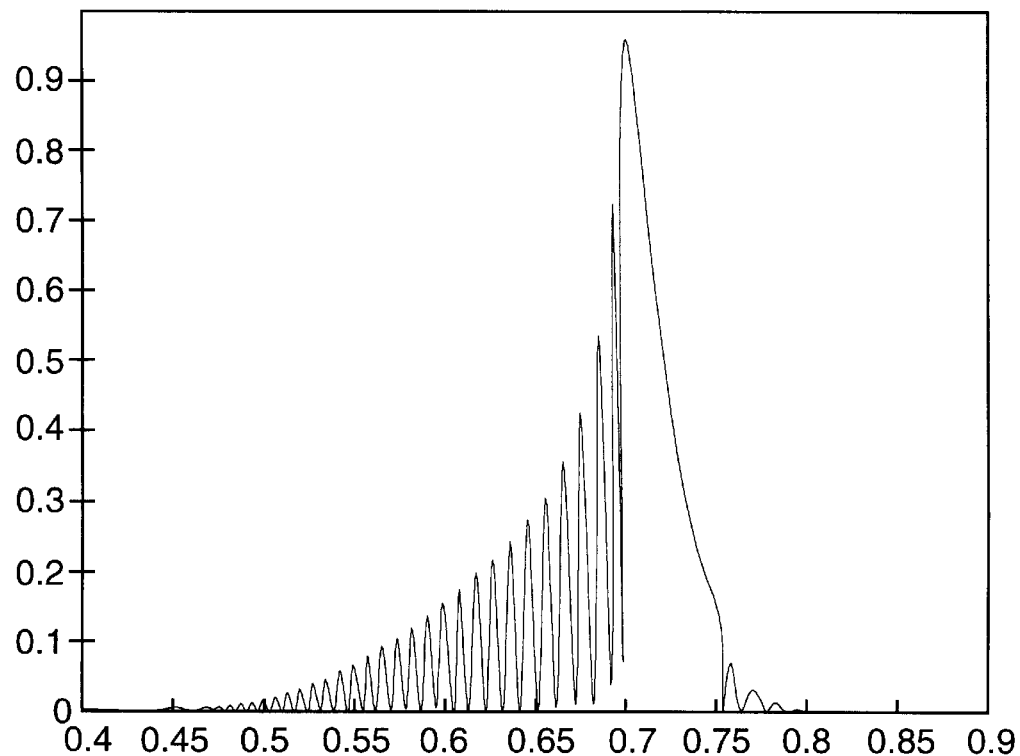
FIG. 2 is a curve representing the spectrum of FIG. 1 multiplied by the response curve of the human eye (photopic curve)

FIG. 3 shows a first embodiment of a liquid crystal display device according to the invention, generally designated by the numerical reference 1. Display device 1 which is intended, in particular, to form a colour image display screen includes a first transparent substrate 2 arranged on a front side, i.e. on the side closest to the viewer (symbolised by an eye in FIG. 3), and a second substrate 4 arranged on a rear side, i.e. on the side furthest from the viewer. Second substrate 4 extends facing first substrate 2 and parallel to the latter. First and second substrates 2 and 4 may be made of glass or of plastic material, the second substrate being able to be opaque, for example black. Substrate 4 may, as is the case in the example shown, be covered with a layer 6 absorbing the light, for example a black layer arranged on the face of the second substrate situated facing first substrate 2.

In the example shown, first substrate 2 is connected to second substrate 4 via a sealing frame 8 so as to delimit between them a cavity 10 in which a film of liquid crystal CL is arranged.

The liquid crystal CL can have at least two states, i.e. a first state in which it reflects the light of a range of wavelengths corresponding to a predetermined colour, for example red and a second state in which it is transparent to light.

The cell described in such an example thus allows red pixels to be displayed on a black background. The liquid crystal used is of the cholesteric type. More precisely, the liquid crystal includes a nematic liquid crystal having positive dielectric anisotropy and chiral dopants. The liquid crystal may, if required, also include a polymer stabilising the different states of the liquid crystal or a dye. The pitch of the cholesteric liquid crystal is typically comprised within the range of 0.2 μm to 1.5 μm.

The surface of first substrate 2 facing second substrate 4 carries a first group of electrodes 14 arranged parallel to a first direction (called direction X hereinafter). The surface of second substrate 4 facing first substrate 2 includes a second group of electrodes 16 arranged perpendicular to the electrodes of the first group (called direction Y hereinafter). This arrangement of crossed electrodes allows a matrix to be defined whose pixels are situated at the crossing points of the respective electrodes, each pixel being capable of forming a picture element of the display device. Such a picture element is formed by applying suitable control voltages to the selected electrodes to change the optical conditions of the liquid crystal situated at the crossing point in question and to switch the pixels by switching the liquid crystal at this point in one of its aforementioned two states, as is well known to the man skilled in the art. It will be noted that with this type of liquid crystal, the state into which it is has been switched is maintained until a new control electric field is applied to the point in question without it being necessary to maintain an electric field between the two electrodes concerned.

Each electrode of groups 14 and 16 may be formed by a conductive strip deposited and structured by conventional techniques and preferably made of tin-indium oxide (ITO).

The display device which has just been briefly described thus allows two colour images to be generated by applying suitable control voltages to the electrodes, for example by a known multiplexing method.

According to the invention, the device includes a filter 18 which is capable of absorbing at least the visible wavelengths which are situated on the side of the range of wavelengths of the predetermined colour closest to wavelength 555 nm. This wavelength corresponds to the wavelength on which the human eye is most sensitive in vision in daytime (photopic vision). It will of course be understood that filter 18 does not absorb the range of wavelengths corresponding to the predetermined colour, red in the example described. It goes without saying that the invention may also be advantageously used with cholesteric type liquid crystals able to reflect other colours such as green, blue, etc.

Filter 18 is arranged on the side of the viewer, or first substrate 2 with respect to liquid crystal film CL, i.e. before the light (symbolised by the arrows L in the drawing) which enters device 1 penetrates the liquid crystal film. Filter 18 may thus provide all its effects and lead to an efficient improvement in the predetermined colour, in this case red.

According to an embodiment, filter 18 is arranged between first substrate 2 and liquid crystal film CL and is for example deposited in the form of a uniform layer over the entire surface of substrate 2 above first group of electrodes 14. Filter 18 may in this case be formed of a layer of polymer charged with dye molecules and deposited in a conventional manner over the surface of the substrate.

According to a third embodiment shown in FIG. 6, filter 18 is incorporated in substrate 2. In other words, the substrate itself forms filter 18 and is for example formed by a plate made of glass or synthetic material charged with dye molecules.

According to an alternative of the first embodiment, filter 18 is formed by a coloured film bonded onto the surface of substrate 2 outside the device as is shown in FIG 4.

According to another alternative embodiment, filter 18 can be printed, for example according to conventional screen printing techniques, onto the outside surface of substrate 2 with respect to the device.

FIG. 5 shows a second embodiment of a display device 20 according to the invention in which the principle of the invention is applied to a liquid crystal display device intended to form a colour image display screen.

Display device 20 includes a liquid crystal cell formed of two parallel substrates 22 and 24 between which are arranged several juxtaposed liquid crystals CL1, CL2 and CL3, each reflecting light from a predetermined wavelength. In the example shown, the liquid crystal cell includes three liquid crystals which reflect respectively the colours green (V), blue (B) and red (R). The three liquid crystals CL1, CL2 and CL3 are distributed in a plurality of adjacent sets E1, E2 . . . , En, formed of three parallel juxtaposed columns which each receive one of the three liquid crystals CL1, CL2 and CL3 according to a predetermined order (V; B; R).

Separation of the liquid crystal columns may for example be achieved via walls P delimiting parallel channels extending between substrates 22 and 24.

Substrate 24 carries on in its inner face a plurality of parallel transparent electrodes 26 which extend respectively facing the liquid crystal columns. Substrate 22 also carries on its inner face a plurality parallel electrodes 28, the latter extending perpendicular to the direction of electrodes 26. Crossing between a group of three juxtaposed electrodes 26 respectively associated with liquid crystals CL1, CL2 and CL3 with an electrode 28 defines an image pixel, such pixel including three sub-pixels, namely a green sub-pixel V, a blue sub-pixel B and a red sub-pixel R. Each of these sub-pixels can be addressed selectively via the application of a suitable control voltage to electrodes 26 and 28 to form a colour pixel.

According to this second embodiment of the invention, the liquid crystal columns (R) which reflect the range of wavelengths corresponding to the colour red are associated with filters 30 capable of absorbing the visible wavelengths with the exception of the red wavelength range. As appears clearly from the Figure, filters 30 are arranged between the liquid crystal columns R and substrate 22, i.e. the substrate through which the light penetrates before passing through the liquid crystals of the cell.

Filters 30 are preferably arranged above control electrodes 28 which are associated with the columns (R). Filters 30 may in this case be formed of a polymer layer charged with dye molecules and conventionally deposited on the inner surface of substrate 22, the layer being then structured into columns via appropriate masks according to photolithographic techniques which are well known to the man skilled in the art.

It will be noted that according to this embodiment, substrate 22 also includes a thickness equalising layer 32 also arranged on the inner surface of substrate 22 either at the places left free between filters 30, layer 32 having substantially the same thickness as that of filters 30, or to embed filters 30 and form a flat layer. This equalising layer 32 allows a constant thickness of the liquid crystals to be assured over the entire surface of the cell, which guarantees a high quality display. Layer 32 is inactive optically.

According to an alternative embodiment which is not shown, each liquid crystal column is associated with a filter similar to filters 30 described hereinbefore and absorbing the visible wavelengths degrading the colour which the liquid crystal reflects and with which it is associated.

Although the invention which has just been described in connection with FIG. 5 is applied to a liquid crystal display device intended to form a colour image display screen including a single cell in which the different types of liquid crystals extend in a same plane, it is of course understood that the invention is not limited to this type of colour display and that according to an alternative embodiment the device may include two superposed cells or more including respectively at least one type of liquid crystal, for example as described in U.S. Pat. No. 5,399,390.

What is claimed is:

1. A liquid crystal display device intended to form a colour image display screen, of the type including:
   a first substrate which is transparent on a front side situated on the side of the viewer;
   a second substrate arranged on a back side facing the first substrate and extending parallel to the latter;
   the first substrate being connected to the second substrate in order to delimit between them a cavity in which at least one film of liquid crystal is arranged;
   said liquid crystal being able to have at least a first state in which it reflects the light of a range of wavelengths of a predetermined colour and at least a second state in which it is transparent,
   the surface of each substrate facing the other substrate including means forming electrodes to allow by selective application of a control voltage to said electrodes, the liquid crystal to pass at least from the first state to the second state or conversely,
   wherein said liquid crystal display includes a filter absorbing at least the visible neighbouring wavelengths of the range of wavelengths of said predetermined colour and the closest to the wavelength 555 nm with the exception of the wavelengths of said predetermined colour and wherein said filter is arranged on the side of the viewer with respect to said film of liquid crystal and wherein said filter is incorporated in said first substrate.

2. A display device according to claim 1, wherein the liquid crystal is of the cholesteric type.

3. A display device according to claim 2, wherein the liquid crystal reflects the colour red.

4. A display device according to claim 1, wherein the second substrate includes a light absorbing layer.

5. A liquid crystal display device intended to form a colour image display screen, of the type including:
   a first substrate which is transparent on a front side situated on the side of the viewer;
   a second substrate arranged on a back side facing the first substrate and extending parallel to the latter;
   the first substrate being connected to the second substrate in order to delimit between them a cavity in which at least one film of liquid crystal is arranged;
   said liquid crystal being able to have at least a first state in which it reflects the light of a range of wavelengths of a predetermined colour and at least a second state in which it is transparent,
   the surface of each substrate facing the other substrate including means forming electrodes to allow by selective application of a control voltage to said electrode, the liquid crystal to pass at least from the first state to the second state or conversely,
   wherein said liquid crystal display includes a filter absorbing at least the visible neighbouring wavelengths of the range of wavelengths of said predetermined colour and the closest to the wavelength 555 nm with the exception of the wavelengths of said predetermined colour and wherein said filter is arranged on the side of the viewer with respect to said film of liquid crystal, wherein said display device includes several juxtaposed liquid crystals each reflecting a range of wavelengths of a predetermined colour and wherein said filter is associated with at least one of the liquid crystals.

6. A display device according to claim 5, wherein it includes a plurality of liquid crystals reflecting respectively different colours including the colour red and wherein the filter is associated with the colour red.

7. A display device according to claim 6, wherein the liquid crystals are distributed in a plurality of adjacent sets formed of a plurality of parallel juxtaposed columns which each receive one of said liquid crystals according to a predetermined order.

8. A display device according to claim 5, wherein one filter is associated with each of said liquid crystals.

* * * * *